July 4, 1967 — T. F. GARLAND — 3,329,268
FEEDER AND SEPARATOR APPARATUS
Filed April 24, 1964

INVENTOR.
THEODORE F. GARLAND
BY Williamson & Palmatier
ATTORNEYS

United States Patent Office 3,329,268
Patented July 4, 1967

3,329,268
FEEDER AND SEPARATOR APPARATUS
Theodore F. Garland, 1226 N. 1st,
Fargo, N. Dak. 58102
Filed Apr. 24, 1964, Ser. No. 362,329
4 Claims. (Cl. 209—423)

This invention relates to a feed device and more particularly to a feed device in combination with an apparatus for use in cleaning particulate material such as gravel, ore and the like.

An object of this invention is to provide a feed device for a submerged type gravity separator and which includes a hopper having control means associated therewith which is operable in response to a change in amount of material within the hopper to control operation of the separator apparatus whereby the latter will never be under-fed or over-fed so that a substantially uniform bed of material will be maintained in the separator apparatus during operation thereof.

Another object of this invention is to provide a submerged type gravity separator having a feed device including a resiliently mounted, vertically shiftable hopper including an arcuately shaped swingably mounted feeder pan shiftable in a fore-and-aft direction so that the particulate material is positively delivered to the separator apparatus and wherein the leading edge of the feeder pan is maintained at a lower level than the trailing edge whereby any liquid will be caused to drip over the front edge of the feeder pan and into the separator.

A further object of this invention is to provide a combination feeder and separator apparatus unit comprising a single unitary structure which is of simple and inexpensive but highly efficient construction and operation.

Figure 1:
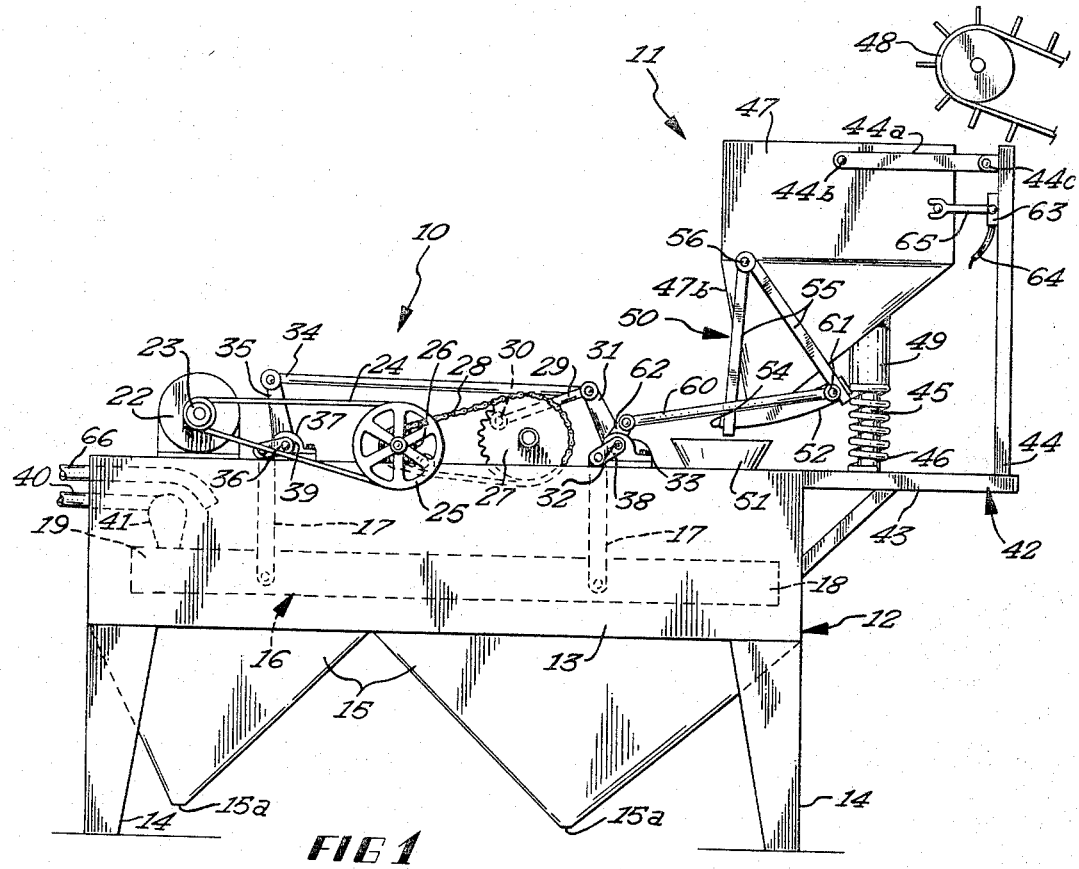
Figure 2:
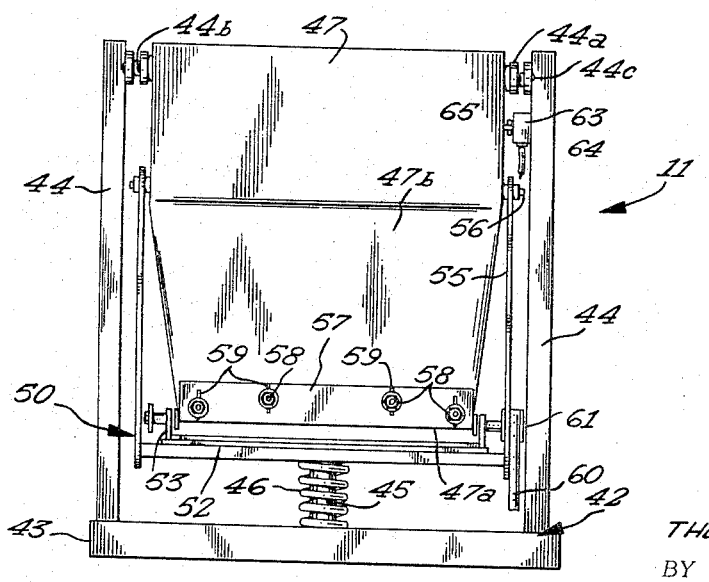

These and other objects and advantages of this invention will more fully appear from the following description made in connection with the accompanying drawing, wherein like character references refer to the same or similar parts throughout the several views, and in which:

FIG. 1 is a side elevational view of the invention; and
FIG. 2 is an end elevational view on an enlarged scale of the feeder device.

Referring now to the drawing, it will be seen that one embodiment of the combination feeder and separator unit designated generally by the reference numeral 10, is there-shown. The feeder and separator unit 10 is comprised of a feeder device 11 and a gravity separator 12 which is of the submerged type and which is especially adaptable for use in cleaning and classifying gravel, ore and the like. This gravity separator includes a liquid-confining tank 13 which is provided with suitable supporting legs 14 and which is adapted to be substantially filled with water.

The tank 13, as best seen in FIG. 1, is provided with a pair of sump portions 15 which have downwardly converging walls and each sump portion terminating in an opening 15a at its lower end. The smaller of the sump portions 15 or the one located at the left as viewed in FIG. 1 receives the material from the egress end of the classifying screen structure and this material is discharged through the lower end or outlet 15a thereof. The other of the sump portions 15 receives the sediment therein and this sediment is also removed through the lower opening 15a thereof. In the embodiment shown, the gravity type separator 12 is provided with a separator and classifying screen structure 16 which is mounted for shifting movement within the tank and which is suspended from the top of the tank by means of supporting arms 17. It will be seen that the screen structure 16 is substantially horizontally disposed to the tank and in the form shown the screen structure is substantially rectangular in configuration. The screen structure 16 has an oscillatory movement consisting of a combined vertical movement and a movement longitudinally of the screen structure. The material being cleaned is supplied to the tank 13 at the ingress end 18 of the screen structure, and during movement of the screen structure the material supplied thereto forms a bed on the screen structure and is moved therealong towards the egress end 19 thereof.

The means provided for oscillating the screen structure 16 during operation of the gravity separator 12 comprises a pitman oscillating mechanism which is mounted on the top of the tank 13. This oscillator means includes a motor 22 provided with the conventional output shaft to which is affixed a drive pulley 23. The drive pulley 23 is drivingly connected by an endless drive belt 24 to a driven pulley 25 which is keyed to a shaft journaled in suitable bearings on the tank. The driven shaft upon which the driven pulley 25 is keyed has a sprocket 26 also secured thereto for rotation therewith and this sprocket 26 drives a relatively large driven sprocket 27 by means of an endless drive chain 28.

The oscillator or pitman linkage is connected to the driven pulley 27 and this linkage includes a drive link 29 having an eccentric connection 30 with the driven sprocket 27 so that upon rotation of the sprocket 27 the driven link 29 will be oscillated. It is pointed out that the driven sprocket 27 is provided with a suitable shaft which is also journaled for rotation on the tank 13.

The drive link 29 is pivotally connected at its other end to a crank arm 31 which is secured to a rock shaft 32 journaled in a suitable bearing 33 affixed to the tank 13. One end of an elongate interconnecting link 34 is pivotally connected to the crank arm 31 and the other end of this interconnecting link is pivotally connected to the upper end of a second crank arm 35. It will be seen that the lower end of the crank arm 35 is also fixedly connected to a rock shaft 36 journaled in a suitable bearing 37 on the tank 13. It will further be noted that the rock shaft 36 and the rock shaft 32 are disposed in substantially parallel relation with respect to each other. The ends of rock shaft 32 have lever arms 38 affixed thereto which are pivotally connected to the supporting arms 17 adjacent one end of the screen structure 18 while the opposite ends of the rock shaft 36 have lever arms 38 affixed thereto which are pivotally connected to the support arms 17 adjacent the other end portion of the screen structure. Thus it will be seen that when the motor 22 is energized, the screen structure 16 will have an oscillatory movement including a vertical and longitudinal component of movement.

A pointed out above, the oscillatory movement of the screen structure 16 imparted by the oscillator causes the material supplied thereto to move along the screen structure away from the ingress end 18 toward the egress end 19 so that a bed of predetermined thickness is formed on the screen structure. This oscillatory movement of the screen structure and formation of the bed thereupon also causes the lighter of the materials which in the instance of gravel cleaning, consists in shale, coal and other foreign material found in natural gravel, to rise in a layer above the heavier material which consists in gravel and graded siliceous material. As the materials move in the bed along the screen structure toward the egress end thereof, the layer of lighter materials is picked up and discharged through an outflow tube 40. The inlet end of the outflow tube 40 comprises a housing 41 which is semi-circular in shape and hollow and communicates with the tube 40. The lower end of the housing 41 has an opening therein extending transversely substantially across the width of the screen structure 16 adjacent the egress end thereof and is disposed in spaced relation above the screen structure and above the layer or bed of heavy siliceous material being moved longitudinally of the screen structure. This outflow tube mechanism is similar in structure to that disclosed in my United States Letters Patent No. 2,824,644 and serves to remove the lighter material from the tank. As the water flows into the elongated opening of the housing 41 passes in close proximity with and through the layer of lighter material so that the water flowing into the slot entrains these lighter suspended materials and carries them out of the tank. As pointed out above, the heavier materials spill over the egress end of the screen structure and are discharged into the sump portion 15 and thereafter outwardly through the opening 15a.

One of the problems now involved with respect to apparatus used in the treatment of particulate material such as gravel cleaning operations is that the bed of materials on the screen structures must be maintained at a predetermined thickness or else the separating operation will be substantially impaired. Therefore it is desirable to render the gravity separator apparatus inoperative in the event that the material being fed to the separator is interrupted or is substantially diminished.

To this end, the feeder device 11 serves to not only supply materials to the separator 12 so that the bed on the screen structure is maintained at a predetermined thickness but this feeder device also controls operation of the separator 12. This feeder device 11 includes a support structure 42 comprised of horizontal support members 43 and vertical support members 44 which are rigidly secured together, and in which the horizontal support members 43 are rigidly secured to the tank 13. One of the horizontal support members 43 is provided with an upstanding guide rod or element 45 and a heavy coil spring 46 is disposed around the guide rod 45 and has its lower end bearing against one of the horizontal support members 43.

A supply hopper 47 is shiftably supported from the support 42 and is vertically movable relative thereto. A conveyor mechanism 48 has its discharge end positioned above the open upper end of the hopper 47 and serves to supply the gravel or ore to be washed to the hopper 47. It will be noted that the hopper 47 is positioned above one end portion of the tank 13 and serves to supply gravel or other material thereto. The lower end portion of the hopper is open and defines a discharge mouth 47a for discharging material therefrom. One of the lower converging walls of the hopper 47 has a downwardly projecting bearing and guide sleeve 49 affixed thereto as by welding and this sleeve is positioned over the guide rod 45 and has its lower end in bearing engagement with the spring 46. Thus downward movement of the hopper 47 is resisted by the spring 46, the latter tending to normally urge the hopper 47 upwardly.

Means are provided for stabilizing the hopper 47 and this means includes a pair of elongate stabilizer arms 44a disposed on opposite sides of the hopper 47 and each arm having one end thereof pivotally connected to the hopper 47 by means of pivots 44b. The opposite end of each arm is pivotally connected as at 44c to an attachment ear carried by the upper end of one of said vertical support members 44. Thus it will be seen that the stabilizing arms 44a and the spring 45, and sleeve 49 serve to mount the hopper 47 for resilient vertical movement relative to the support 42.

Means are also provided for discharging material from the hopper 47 in controlled amounts to the tank 13 and this means includes a feeder pan mechanism 50 which is swingably mounted on the hopper 47 and which serves to discharge the material to an inlet hopper or funnel member 51 carried by the tank 13 and positioned above the ingress end 18 of the screen structure 16. The feed pan mechanism 50 includes a feed pan member 52 which is of arcuate configuration and which has upturned side flanges 53. This feed pan member 52 has a leading edge 54 which is disposed at a lower level than the trailing edge thereof during swinging movement of the pan member.

The means for swingably mounting the pan member 52 from the hopper 47 comprises a pair of inverted V-shaped suspension structures each located at one side of the pan member 52 and each comprised of a pair of elongate angularly related suspension arms 55. It will be seen that the lower end of each pair of suspension arms for each suspension structure is rigidly secured to the pan member 52 adjacent the ends thereof and converge upwardly and are rigidly joined together at their respective upper ends. The joined ends of the suspension arms 55 are pivotally connected as at 56 to the sides of the hopper 47 so that the pan 52 is swingably mounted below the discharge opening of the hopper.

It is pointed out that the radius of swinging movement of the pan 52 defined by the suspension arms also corresponds to the radius of curvature of the pan member 52. It is also pointed out that the pan member 52 during swinging movement thereof does not move out of obstructing relation with respect to the discharge opening or mouth 47a of the hopper 47 but receives material from the hopper and during the rearward stroke discharges the gravel material into the funnel member 51.

Means are also provided for controlling the amount of material which is delivered from the hopper 47 and into the pan 52. The lower end portion of the front downwardly converging wall 47b of the hopper 47 is cut away and a vertically adjustable gate member 57 is secured to the lower end portion of this front wall 47b for vertical adjustment relative thereto. The interconnection between the front wall 47b of the hopper 47 and the gate member 57 includes bolt assemblies 58 which project through apertures in the front wall 47b and through elongate slots 59 in the gate member 57. It will be seen that the gate member 57 traverses the width of the lower end portion of the front wall 47b and by vertically adjusting the gate 57, the opening or mouth of the hopper 47 may be variously adjusted.

Means are also provided for reciprocating the feed pan mechanism 50 and this includes a pair of elongate drive links 60, each having their rearmost ends pivotally connected to the rearmost end portion of the side flanges 53 of the pan member 52 by means of pivots 61. The forward end portion of each of the drive links 60 are pivotally connected to crank arms 62 which are affixed or otherwise keyed to the rock shaft 32. It will therefore be seen that when the motor 22 is energized, not only will the screen structure 16 be oscillated but the feeder pan mechanism 50 will also be oscillated.

It is again pointed out, however, that it is highly desirable to render the gravity separator inoperative when the bed of material or gravel moving along the screen structure 19 falls below a predetermined thickness. This will occur when the amount of material being supplied to the gravity separator becomes diminished or interrupted from the hopper 47. Therefore means are provided for controlling operation of the gravity separator in the event that the material supplied to the gravity separator will be interrupted or substantially diminished. This control means includes a control switch 63, which, as seen, is mounted on one of the vertical support members 44 adjacent the upper end thereof and connected by suitable conductors 64 in circuit controlling relation with respect to the circuit which supplies current to the motor 22. Therefore when the switch 63 is opened, thus opening the circuit to the motor 22, the latter will be de-energized and when the switch 63 is closed, the motor 22 will be energized.

The means for operating the switch 63 includes a switch operating lever 65 pivotally carried by one side of the hopper 47 and being interconnected in controlling relation with respect to the switch element of the switch 63. The actuating lever 65 serves to close the switch 63 when the hopper 47 to moved downwardly in response to the supply of a predetermined amount of material to the hopper 47. The lever 65 on the other hand serves to open the switch 63 when the hopper is moved upwardly by the spring 47 as material is emptied from the hopper and the weight thereof falls below a predetermined amount. It will therefore be seen that when the hopper 47 is supplied with gravel, ore or the like so that the weight of the hopper overcomes the resistance of spring 46, then the motor operating the gravity separator screen structure 16 will be energized and the material will be positively supplied to the tank 13.

If the combined feeder and separator unit 10 is used in a gravel cleaning operation, the material will be supplied by the conveyor 48 to the hopper 47 from a washer plant which gives the gravel a mild washing and screens the material to the desired predetermined size. It is then necessary to remove the deleterious material from the gravel such as shale, coal and other lightweight porous material. If the hopper 47 was originally emptied or contained only a small amount of material, the motor 22 will be de-energized and the separator screen structure 16 will be inoperative. As the gravel material is fed into the hopper 47, and a predetermined weight is reached then the hopper will be shifted downwardly in response to gravity and overcome the action of the spring 46. When this occurs, the switch 63 is closed and the motor 22 is energized whereby not only is the screen structure 16 oscillated but the feeder pan mechanism 50 is also oscillated.

As the feeder pan member 52 is swung relative to the mouth 47a of the hopper 47, gravel is discharged from the leading edge 54 of the pan member as the latter is moved rearwardly or to the right as viewed in FIG. 1. During the forward stroke, the material accumulates on the upper surface of the pan member and is positively fed into the funnel member during the rearward stroke of the pan member. Since the rear edge of the pan member is maintained at a higher level than the leading edge 54 of the pan member during all positions of swinging movement thereof, any liquids adhering to the gravel material will drip from the leading edge into the tank 13. Thus the drip feed is always into the tank 13 and the liquids will not escape from the rear edge of the pan member 52. It is also pointed out that the chance of any material escaping or being lost over the rear edge of the feeder pan member 52 is minimized if not precluded by the particular construction and operation of the feeder pan mechanism.

The gravity separator 12 will continue to operate as long as the hopper 47 is supplying sufficient material to the screen structure 16 so that a substantially uniform bed will be maintained thereupon. However, in the event that the weight of the material in the hopper 47 falls below a predetermined weight, then the spring 46 will urge the hopper upwardly thus causing the actuating lever 65 to open the switch 63 and de-energize the motor 22. Not only will the screen structure 16 become inoperative, but the feeder pan mechanism 50 will also become inoperative thus preventing under-feed to the gravity separator. It will therefore be seen that with this unique feed device 11, the chances of over-feeding and under-feeding the gravity separator are also substantially precluded. It is pointed out that water will be supplied to the tank 13 through a suitable conduit 66 so that a predetermined level of water is maintained in the tank.

From the foregoing description it will be seen that I have provided a novel feeder device which is especially adaptable for use in combination with a gravity separator of the submerged type and used in gravel cleaning and ore washing operations.

It will be noted from the preceding paragraphs that through the use of my novel feeder device, material treating apparatus such as gravity separators may function more efficiently since there is absolutely no chance of the separator being over-fed or under-fed during the operation thereof.

It will further be seen that I have provided a rather compact and highly economical gravity separator and feeder unit which is not only of simple and inexpensive construction but one which functions in a more efficient manner than any heretofore known comparable devices.

It will, of course, be understood that various changes may be made in the form, details, arrangement and proportions of the various parts without departing from the scope of my invention.

What is claimed is:

1. In combination with a submerged type gravity separator apparatus for use in cleaning particulate material, such as gravel, ore and the like, said apparatus comprising
   a liquid-confining tank adapted to confine a quantity of water therein,
   a generally horizontally oriented screen structure positioned within said tank below the normal liquid level therein, and being mounted for oscillating movement relative to the tank, said screen structure having an ingress end for receiving thereon the gravel to be washed, and having an egress end over which the washed gravel is discharged,
   power means for oscillating said screen structure including an electric motor,
   drive linkage interconnecting said electric motor with said screen structure,
   an outflow tube means having an inlet end positioned below the normal water level in said tank and adjacent and above the egress end of said screen structure whereby debris and other deleterious material will be removed from said tank through said outflow tube means during oscillation of the screen structure,
   a hopper support structure mounted on said tank,
   a supply hopper shiftably mounted on said support structure for vertical shifting movement relative thereto in response to a change in the weight of the material within the hopper, said hopper having a discharge outlet in the lower portion thereof through which the gravel material to be washed is discharged,
   resilient means on said hopper support structure engaging said hopper to normally urge the same upwardly,
   an arcuate feeder pan positioned below said discharged outlet and being pivotally mounted on said hopper for swinging movement relative thereto, said feeder pan having a leading edge and a trailing edge and being operable during rearward swinging movement thereof to feed the gravel material to be washed from the leading edge thereof into the tank and upon the ingress end of the screen structure,
   linkage means interconnected with said feeder pan and being interconnected with said drive linkage to drivingly pivot said feeder pan when said electric motor is energized,
   control means comprising a switch mechanism operatively interrelated with said electric motor for energizing and de-energizing the same, switch operator means on said hopper engaging said switch mechanism for operating the latter, said switch operator means closing the switch to energize the motor when said hopper is shifted downwardly as the weight of the material therein overcomes the resilient means whereby the feeder pan will be pivoted simultaneously during oscillation of said screen structure, said switch operator means being operable to open the switch and de-energize said motor when the hopper is shifted vertically upwardly by said resilient means as the material within the hopper is diminished to thereby stop movement of said feeder pan and said screen structure.

2. The device as defined in claim 1 wherein said trailing edge of the feeder pan mechanism is disposed above the level of the leading edge during all positions of movement of said feeder pan mechanism.

3. The device as defined in claim 1 and an adjustable gate structure shiftably mounted on said supply hopper and being shiftable to variously adjust the size of said discharge outlet of the hopper to thereby control the amount of particulate material discharged therefrom.

4. The invention as defined in claim 1 wherein the arcuate configuration of said feeder pan mechanism is defined by a radius corresponding substantially to the radius of swinging movement of said feeder pan mechanism.

References Cited

UNITED STATES PATENTS

| 1,151,976 | 8/1915 | Symons | 209—329 |
| 2,381,505 | 8/1945 | Lindholm | 222—64 X |
| 2,730,932 | 1/1956 | McCrystle et al. | 209—246 |
| 2,824,644 | 2/1958 | Garland | 209—423 |

FOREIGN PATENTS 534,764   12/1956   Canada.

HARRY B. THORNTON, *Primary Examiner.*

L. EATHERTON, *Assistant Examiner.*